(12) United States Patent
Niu

(10) Patent No.: US 7,018,742 B2
(45) Date of Patent: Mar. 28, 2006

(54) ACTIVE CARBON-BASED NANOTUBE BATTERY

(76) Inventor: Xi Xian Niu, 25832 Fallenwood, Lake Forest, CA (US) 92630

( * ) Notice: Subject to any disclaimer, the term of this patent is extended or adjusted under 35 U.S.C. 154(b) by 0 days.

(21) Appl. No.: 10/781,221

(22) Filed: Feb. 18, 2004

(65) Prior Publication Data

US 2005/0181282 A1 Aug. 18, 2005

(51) Int. Cl.
*H01M 4/58* (2006.01)
*H01G 4/005* (2006.01)

(52) U.S. Cl. .............. 429/231.8; 429/162; 429/245; 361/305

(58) Field of Classification Search ............ 429/66, 429/231.8, 245, 232, 162, 164, 7; 361/301.1, 361/301.2, 301.4, 305
See application file for complete search history.

(56) References Cited

U.S. PATENT DOCUMENTS

| 5,879,836 A | * | 3/1999 | Ikeda et al. ............... 429/231.8 |
| 6,346,346 B1 | * | 2/2002 | Naskali ...................... 429/127 |
| 6,713,039 B1 | * | 3/2004 | Tabata et al. ............... 423/643 |

* cited by examiner

Primary Examiner—Jonathan Crepeau
(74) Attorney, Agent, or Firm—Clement Cheng

(57) ABSTRACT

A Carbon Nanofiber-based (CNT—Carbon Nanotube) electrical high performance battery comprises a cell trough filled with electrolyte, a spring coil locking onto said cell trough, an anode/cathode substrate plate installed within said cell trough with its separation membrane, and positive and negative terminals installed outside the cell cap connecting to said anode/cathode substrate plate respectively.

8 Claims, 1 Drawing Sheet

ACTIVE CARBON-BASED NANOTUBE BATTERY

TECHNICAL FIELD

The present invention relates to electronic-chemical battery field, more particularly a Carbon-based Nanotube (CNT) battery.

BACKGROUND OF THE INVENTION

Since Plante invented the lead-based battery in 1860, numerous efforts have been made within the electronic-chemical field. There have also been various technical improvements.

However, there lacks much improvement of defects and insufficiencies among existing batteries in the market. The first insufficiency that seriously restrains the practicality of the battery is the long charging time. Due to the limited size of the substrate plate in the past, long-hour chemical charging was necessary. Otherwise, short-hour large current recharging not only may cause surface burn, reduction in the life of the battery, but also may cause overheated deformation, crack and damage. Large current discharging also causes heat gain, which lowers battery voltage while battery capacity is reduced from increased discharging current.

The shortest charging time for the existing battery is about 30 minutes, and the longer ones may take as long as 8 hours.

The second insufficiency that seriously restrains the practicality of the battery is the low specific power ratio. The low ratio normally causes the overweight of the battery. The common power ratio for lead-based battery is only around 30–40 Wh/Kg. The inconvenience of an overweight battery greatly limits the further application scope and exceedingly reduces the efficiency of common transportation devises like automobiles, trains, airplane, boats, tanks, etc., which in fact are both the main reasons that electrical automobiles cannot be popularized in the recent markets.

OBJECTS AND ADVANTAGES OF THE INVENTION

Accordingly, the main purpose of the present invention is to overcome said defects and insufficiencies by providing an Active Carbon-based Nanotube (CNT) battery, which can receive large current charging to shorten charging time, and has a high power ratio to reduce the battery weight in order to broaden the battery application scope in modern life.

DETAIL DESCRIPTION

Figure 1:
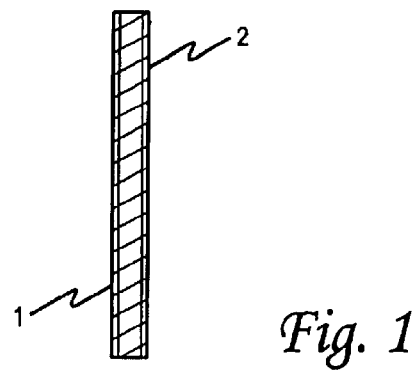
FIG. 1 is a schematic illustration of an anode/cathode substrate plate of the present invention.

The present Active Carbon Nanofiber-based (CNT—Carbon Nanotube) electrical high performance battery comprises a cell trough filled with electrolyte, a spring coil locking onto said cell trough, an anode/cathode substrate plate installed within said cell trough with its separation membrane, and positive and negative terminals installed outside the cell cap connecting to said anode/cathode substrate plate respectively. The anode substrate plate is composed of an aluminum plate and an active Carbon Nanofiber layer spray-coated on the aluminum plate surface. The Cathode substrate plate is composed of a copper plate and an active Carbon Nanofiber layer spray-coated on the copper plate surface.

Active Carbon Nanofiber itself contains quantum sizing effect, micro sizing effect, surface effect, and Macroscopic Quantum Tunneling. It has a very large relative surface area, very high activity and density rate, high heat dissipation rate, and large dispersion rate. Even passing through a high current it only results in very small current concentration. As the result anode/cathode substrate plates made from said Carbon Nanofiber can pass through very large recharging and discharging electrical current without causing joule heat, nor accompanying heat effects. Therefore, it greatly reduces recharging time. This present invention well mingles speedy electrical recharging by high-physical electrical current flow, with slow electrical discharging by chemical long period low voltage low current flow.

The individual tube diameter of the Carbon Nanofiber is 20–80 nm, with the length of 200–300 nm. The actively characteristics and its relatively large surface area of said tube is most fitted into the manufacture of the anode/cathode substrate plate.

There exists a gap between each set of the substrate plate and its separation membrane, forming a capacitor-like functionality. The separation membrane is made by high-molecule, high-insulation cloth, with the size of the battery inner trough. Since this combination equals to a parallel connection between said capacitor and the battery, and this combination has both characteristics of an uf-class capacitor and a high-capacity battery, the equivalent circuit of this combination can be resembled to a parallel connection of one uf-class capacitor and one high-capacity battery.

To further analyze the equivalent circuit:

When discharging starts, the capacitor discharges first, which would fit with the high current discharging process. During extra long discharging time, the battery may discharge slowly, which would have the characteristic of long time discharging process. The total discharging current amount will equal to the sum current from the capacitor and the battery. When charging starts, the capacitor charges first, that would prevent the possible explosion from the overloaded current. The total charging current will equal to the charged current sum of the capacitor and the battery. This combination is similar to the outer circuit parallelly connected with several capacitors.

Battery has the same working voltage V as capacitors, barring interactions between the two elements. If the battery current was said to be I, the output would be E=IV. If the capacity of the capacitor was said to be C, the output would be $W=\frac{1}{2}CV^2$. As the result, output power sum is P=E+W. Power sum is in fact way larger than battery or one single capacitor. While the weight of the device decreased, the power ratio dramatically increased.

EMBODIMENTS

The present invention is embodied as follows.

The present invention provides an Active Carbon Nanotube battery (CNT), which can receive and provide large current recharging/discharging to shorten charging time, and has a high power ratio to reduce the battery weight in order to broaden the battery application scope in modern life. The reduced weight and the increased charging current of this CNT battery dramatically increased the whole power ratio to 300 Wh/Kg, while the action power can reach higher than 1000 W/Kg. The present invention has both battery and capacitor's characteristics. The capacitor is from 8 uf to 3000 uf, and the battery capacity is from 150 mAH to 200 AH. The battery action current can reach 20000 AH. The weight of the invention is only one eleventh (1/11) and the volume is only one sixth (1/6) comparing to a lead-based battery. The shortest charging time is 90 seconds. It can be widely applied in industrial field, mass transportation, national defense purposes etc.

As shown on FIG. 1, in a preferred embodiment, the anode/cathode substrate plate is made by aluminum, copper plates 1, and a Carbon-based Nanofiber layer 2 spray-coated on the surface of said conductive plates. The individual tube diameter of the Carbon Nanofiber layer is 20–80 nm, with the length of 200–300 nm. There exists a gap in between each set of the substrate plate and the separation membrane, forming the capacity-like functionality.

Figure 2:
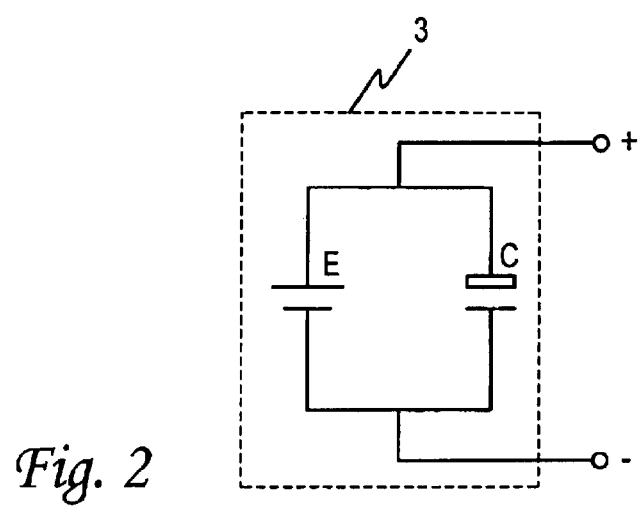
FIG. 2 is a schematic circuit illustration of the present invention.
Figure 3:
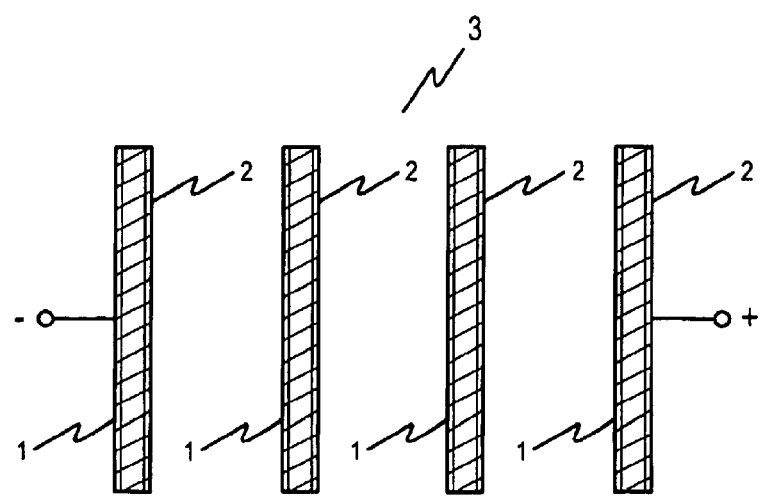
FIG. 3 is a cross-section of the battery showing the gaps.

As shown as FIG. 2, the present Carbon Nanotube (CNT) battery 3 has an equivalent effect as a parallel connection of a battery E and a capacitor C, with the sum output power of P=E+W.

There are three possible embodiments as follows.

1. A Carbon-based Nanotube (CNT) battery comprises of a battery cell trough, electrolyte, a spring coil, an anode/cathode substrate plate and its separation membrane 40, and external positive and negative terminals. The anode substrate plate is composed of an aluminum plate and an active Carbon Nanofiber layer. Negative terminal plate is composed of a copper plate and an active Carbon Nanofiber layer. The individual tube diameter of the Carbon Nanofiber layer is 20 nm, with the length of 290 nm. There exists a gap in between each set of the substrate plate and its separation membrane 40, forming the capacity-like functionality having an equivalent effect as a parallel connection of a battery and a capacitor. The separation membrane is made by high-molecule, high-insulation cloth, with the size of the battery inner trough. Said Carbon-based Nanotube (CNT) battery is able to allow high current recharging/discharging process, with 1/17 charging time than before. The power ratio is 8 times higher than lead-based batteries. The weight of the battery is dramatically reduced.

2. A Carbon-based Nanotube (CNT) battery comprises of a battery cell trough, electrolyte, a spring coil, an anode/cathode substrate plate and its separation membrane, and external positive and negative terminals. The anode substrate plate is composed of an aluminum plate and an active Carbon Nanofiber layer. Negative terminal plate is composed of a copper plate and an active Carbon Nanofiber layer. The individual tube diameter of the Carbon Nanofiber layer is 80 nm, with the length of 300 nm. Same as embodiment 1, said Carbon-based Nanotube (CNT) battery is able to allow high current recharging/discharging process, with 1/10 charging time than before. The power ratio is 7 times higher than lead-based batteries. The weight of the battery is dramatically reduced.

3. A Carbon-based Nanotube (CNT) battery comprises of a battery cell trough, electrolyte, a spring coil, an anode/cathode substrate plate and its separation membrane, and external positive and negative terminals. The anode substrate plate is composed of an aluminum plate and an active Carbon Nanofiber layer. Negative terminal plate is composed of a copper plate and an active Carbon Nanofiber layer. The individual tube diameter of the Carbon Nanofiber layer is 60 nm, with the length of 200 nm. Same as embodiment 1, said Carbon-based Nanotube (CNT) battery is able to allow high current recharging/discharging process, with 1/20 charging lime than before. The power ratio is 10 times higher than lead-based batteries. The weight of the battery is dramatically reduced.

I claim:

1. An Active Carbon Nanofiber-based battery comprising a cell trough filled with electrolyte with a cell cap, a spring coil locking onto said cell trough, an anode/cathode substrate plate installed within the cell trough linking with its respective separation membrane, and positive and negative terminals installed outside the cell cap connecting to said anode/cathode substrate plate respectively; whereas the anode substrate plate is composed of an aluminum plate and a Carbon Nanofiber layer spray-coated on the aluminum plate surface; whereas the cathode substrate plate is composed of a copper plate and a Carbon Nanofiber layer spray-coated on the copper plate surface, wherein gaps are formed between sets of substrate plates and their separation membranes, whereby the battery can have a large capacity with a capacitor-like functionality.

2. The Active Carbon Nanofiber-based battery in claim 1, wherein the individual tube diameter of the Carbon Nanofiber layer is 20–80 nm, with the length of 200–300 nm.

3. The Active Carbon Nanofiber-based battery in claim 1, wherein the separation membrane is made by high-molecule, high-insulation cloth, with the size of the battery inner trough.

4. The Active Carbon Nanofiber-based battery in claim 1, wherein individual tube diameter of the Carbon Nanofiber layer is 20 nm, with the length of 290 nm.

5. The Active Carbon Nanofiber-based battery in claim 1, wherein individual tube diameter of the Carbon Nanofiber layer is 80 nm, with the length of 300 nm.

6. The Active Carbon Nanofiber-based battery in claim 1, wherein individual tube diameter of the Carbon Nanofiber layer is 60 nm, with the length of 200 nm.

7. The Active Carbon Nanofiber-based battery in claim 1, wherein capacitance ranges from 8 uf to 3000 uf.

8. The Active Carbon Nanofiber-based battery in claim 1, wherein battery capacity ranges from 150 mAH to 200 AH.

* * * * *